(No Model.) 2 Sheets—Sheet 1.

P. C. MORSE & H. D. WINTON.
RAILWAY SIGNAL.

No. 436,371. Patented Sept. 16, 1890.

Witnesses:
J. M. Dolan
A. P. Merrill

Inventors
Preston C. Morse
Henry D. Winton

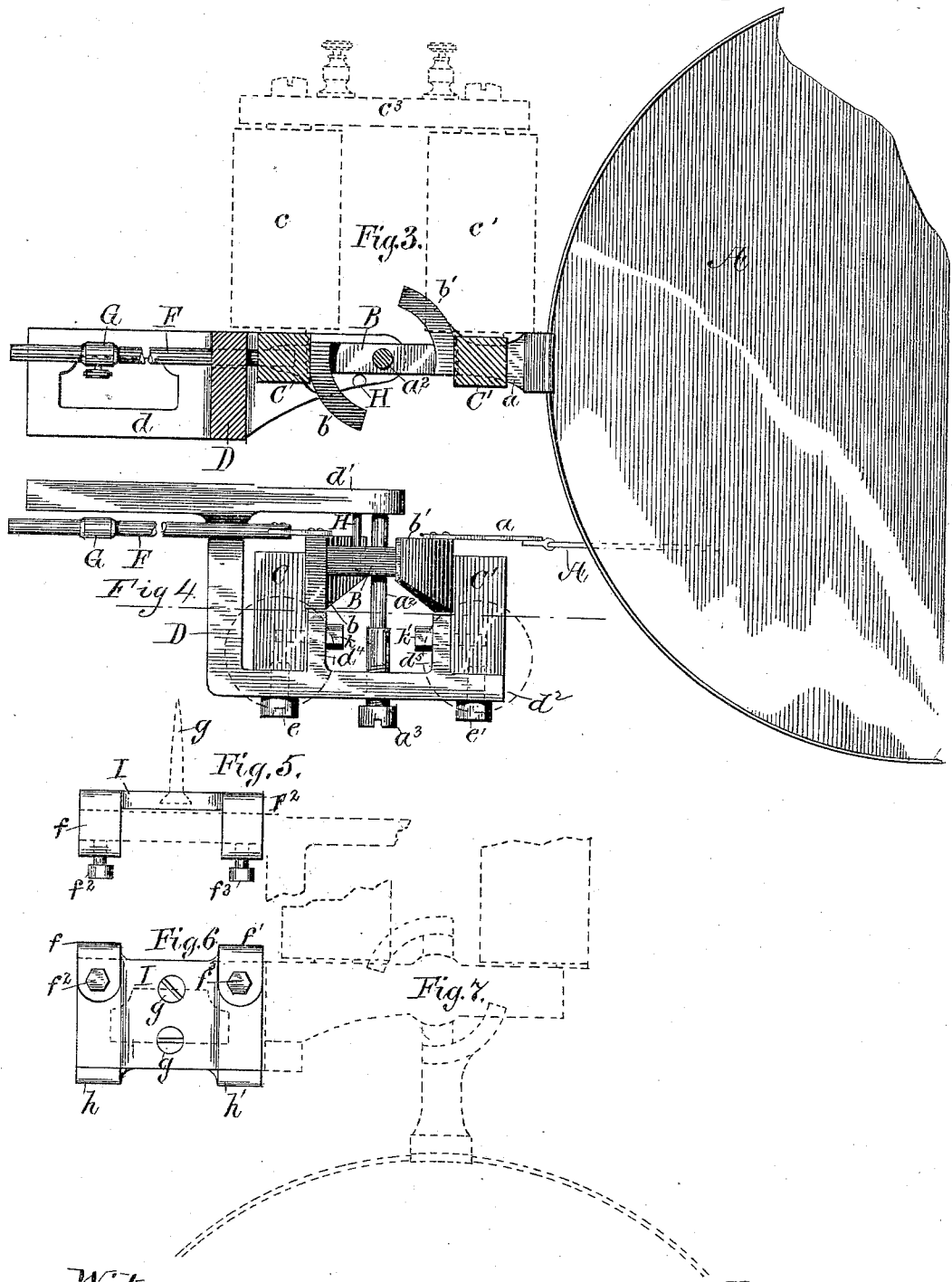

UNITED STATES PATENT OFFICE.

PRESTON C. MORSE, OF NATICK, AND HENRY D. WINTON, OF WELLESLEY HILLS, MASSACHUSETTS, ASSIGNORS, BY MESNE ASSIGNMENTS, TO THE HALL SIGNAL COMPANY, OF PORTLAND, MAINE.

RAILWAY-SIGNAL.

SPECIFICATION forming part of Letters Patent No. 436,371, dated September 16, 1890.

Application filed May 22, 1889. Serial No. 311,715. (No model.)

*To all whom it may concern:*

Be it known that we, PRESTON C. MORSE, of Natick, in the county of Middlesex, and HENRY D. WINTON, of Wellesley Hills, in the county of Norfolk and State of Massachusetts, citizens of the United States, have invented a new and useful Improvement in Railway-Signals, of which the following is a full, clear, and exact description, reference being had to the accompanying drawings, forming a part of this specification, in explaining its nature.

This invention relates to an improvement in railway-signal instruments adapted to be used in connection with any system employing an electric current for its operation.

The object of our invention is the construction of an automatic railway-signal that will operate with the expenditure of a less amount of battery-power than has heretofore been attainable except through the intervention of clock mechanism. For this purpose we provide the electro-magnet with prolongated poles beyond their helices and mount a novelly-constructed armature on a shaft whose bearings are contained in a brass bracket which holds the electro-magnet, and cause it to revolve between the poles of the magnet when the magnet is energized. The prolongated poles and the armature are both curved upon the arc of a circle, the radius of the poles being about one sixty-fourth of an inch greater than that of the armature. The signal-disk is connected with the armature, and as the intervening space between the poles and armature is just sufficient for the armature in its revolution to clear the poles, and owing to this fact, together with the fact that whatever position the signal assumes the distance between the poles and armature remains the same, the signal can be operated with a much less number of cells of battery than in heretofore-devised automatic electrical signals. In some electric signals the gravity operation of the signal removes the armature so far from the magnet that when the signal comes to a state of rest the distance between the magnet and its armature is so great that to start the signal from its normal condition requires a large expenditure of electric power. In our invention the armature is constructed in such relation to the magnetic field that the signal can be operated with a much less amount of battery than the signals of the device above referred to.

Figure 1:
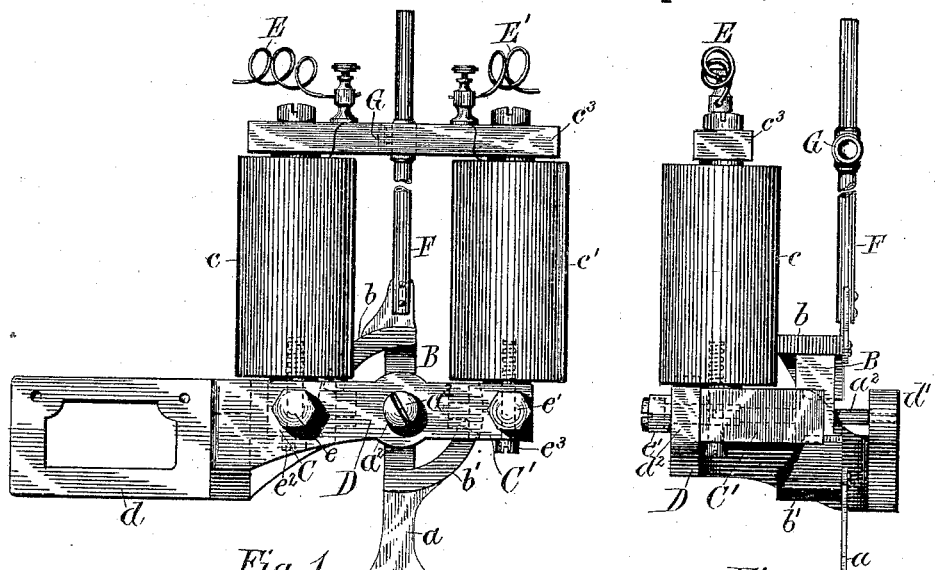
Figure 2:
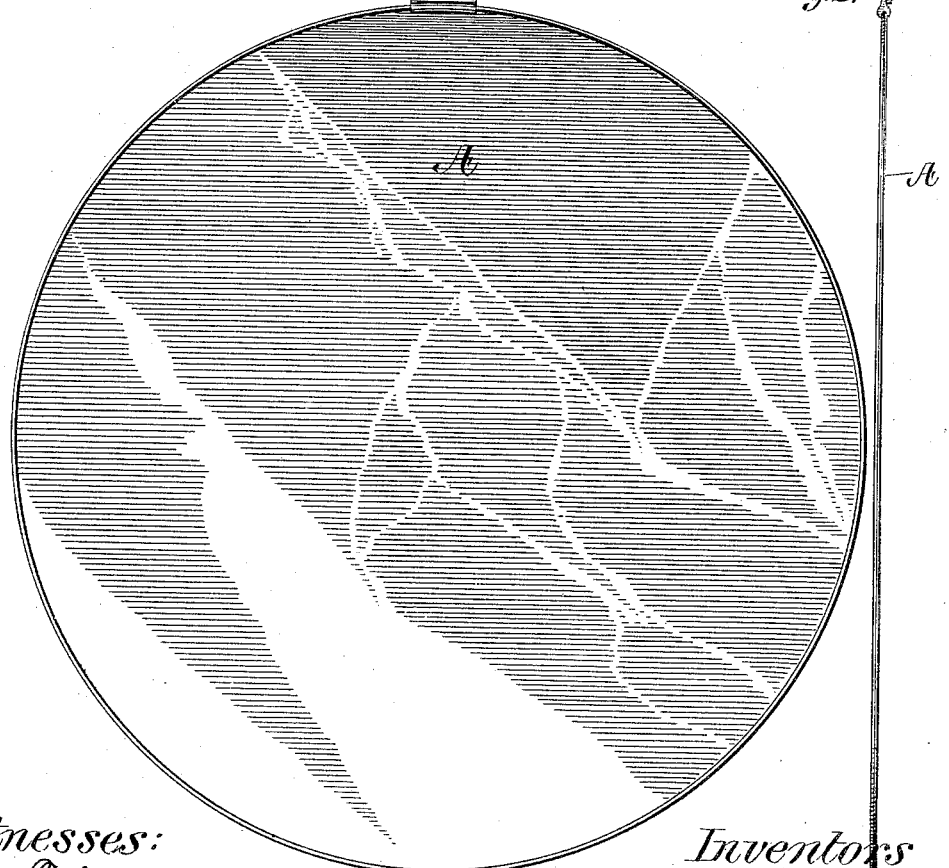

In the drawings, Figure 1 is a front elevation of the apparatus. Fig. 2 is a side elevation of the same. Fig. 3 is a view partly in elevation and partly in vertical section. Fig. 4 is a view in plan thereof, the position of the magnet being shown by dotted lines. Figs. 5, 6, and 7 are detail views, to which reference will hereinafter be made.

D is a bracket, preferably of brass, secured to which by screw-bolts $e\,e'$ are soft-iron bars $C\,C'$, a portion of whose interior side surfaces is curved upon the arc of a circle. The electro-magnet $c\,c'$ is secured to these bars by screws $e^2\,e^3$, which enter the cores of the magnet, and when thus secured the bars become the prolongated poles of the magnet. To more thoroughly secure these prolongated poles in position, projections $d^4\,d^5$ are formed upon the bracket D, to which projections said poles are secured by screws $k\,k'$.

B is the armature, which consists of a soft-iron bar, to each end of which is attached wings $b\,b'$, curved upon the arc of a circle, and they increase in width from their outer or unsupported ends to the end connected or integral with the bar of the armature. One of the wings of the armature extends from one end of the bar, and the other wing of the armature from the other end of the bar, so that the two sections or wings of the armature are opposite each other. It will be seen that each wing of the armature has a flat edge arranged upon the outside of the end of the prolongated poles $C\,C'$, and an inclined edge toward the magnet, so that as the armature is rotated by the magnet a constantly-increasing width of metal or armature is brought into the field of the magnet. The wings of the armature are curved upon the arc of a circle whose diameter is about one sixty-fourth of an inch less than that upon which the prolongated poles are curved. The shaft $a^2$ passes through the center of the armature, and has bearings, respectively, in a portion $d'$ of the bracket D and in the end of a screw $a^3$, extending through the portion $d^2$ of the bracket D. The screw $a^3$ extends through the bracket D a sufficient distance to admit of the armature being taken out of its bearings by the removal of the screw.

A is the signal-disk connected to the armature B by a metal piece $a$. To the opposite end of the armature B, to which the signal A is attached, is secured a balancing-rod F, upon which is an adjustable weight G. The cores of the electro-magnets $c\ c'$ are secured to each other by the connecting cross-bar $c^3$, upon which are mounted suitably-insulated binding-posts forming the terminals of the electro-magnet.

H is a stud or pin placed in the bracket D in such a position as to govern the rotation of the armature in both directions.

Referring to Figs. 5, 6, and 7, I is a holder, which is to be screwed by screws $g\ g$ into the signal-case, which is adapted to receive the portion $d$ of the bracket D, and is held in position by set-screws $f^2\ f^3$ in projections $f\ f'$, the lugs $h\ h'$ forming the bottom support of the bracket.

Having thus described the construction of our improved signal, we will now proceed to explain its operation. When is is desired to display the signal by a gravity movement, the bracket I is to be screwed into the signal-case in such a position that when the signal-instrument is secured to it the disk A, when in the position shown in Figs. 1 and 2, will be seen through the glass.

The operation is as follows: The weight G upon the balancing-lever F is to be placed at such a point as to not quite overbalance the signal-disk. The signal-disk being the heavier will fall by gravity to the position shown in Figs. 1 and 2. When a circuit is completed through the electro-magnet $c\ c'$, the prolongated poles C C' will become charged and cause the armature to be turned upon its axis $a^2$ a portion of a revolution, preferably about a quarter, and this turning result is owing to the shape of the armature, which is formed to bring into the field of the magnet upon its rotation a constantly-increasing body or width of metal, so that the pull or attraction of the magnet is constantly exerted to bring the largest body of metal in line, and this of course causes the armature to be turned until this result is accomplished, or until stud H stops its further movement. This moves the signal from one position to another. If, for instance, the normal position is "danger," it it causes it to be moved from that position to another position, which, for instance, indicates "safety," as shown in Fig. 3, and it is held in such position so long as the electric circuit is maintained. When this ceases, the signal drops by gravity to its original or "danger" position.

The advantage of the invention arises from the simplicity of the construction, whereby its perfect operation is insured, as there are no parts that can easily get out of order or become disarranged, or which require nice adjustment or special attention to keep right, and also from the cheapness with which it can be constructed.

It will be understood that the signal-disk A and its balancing-rod F may be placed on shaft $a^2$ between the armature and portion $d'$ of bracket D, instead of being directly connected with the armature.

Having thus fully described our invention, we claim and desire to secure by Letters Patent of the United States—

1. The combination, with an electro-magnet having the prolongated poles C C', of the armature B, pivoted between said poles and having the curved wings $b\ b'$ extended in the direction of the length of the axis of the said armature and arranged between said poles and provided with straight and inclined edges, the latter edges being inside of the ends of said poles and the straight edges being outside of the said ends, and a signal target or disk connected to the straight side of the said armature, substantially as set forth.

2. The combination of the coils $c\ c'$, the prolongated poles C C', extending at a right angle to the length of the coils to bring their operating-surfaces beyond the sides of the coils, with an armature having the cross-bar pivoted at the center of its length between the side surfaces of said poles' projections and having the regularly-curved wings $b\ b'$ decreasing in width from their bases, substantially as and for the purposes specified.

3. The combination of the bracket D, the coils $c\ c'$, secured to the top of said bracket, the poles C C', fastened to the bracket by the screw-bolts $e\ e'$ and $k\ k'$ and to the coils by the screws $e^2\ e^3$, the armature B, having the wings $b\ b'$ pivoted to the bracket, and the signal A, attached to one wing of the armature, substantially as described.

4. The combination of a bracket, an electro-magnet supported by said bracket, an armature having curved wings pivoted at the center of its length to said bracket and arranged between the cores of said magnet, a balancing arm, rod, or bar attached directly to one wing of the armature, and a target attached directly to the other wing of said armature, as and for the purposes specified.

5. The combination of a bracket supporting a pendent signal, an electro-magnet, and an armature of the character specified, and having the slide-section $d$ with the bracket-holder I, having cross bars or sections, and set-screws carried by said cross-bars to bear against the slide, substantially as described.

6. The combination of the bracket D, comprising a base-piece and an extending section having the projections $d^4$ for supporting the coils and their prolonged poles, as specified, with an armature, its pivot $a^2$, having one bearing in the base-section of the bracket and in the end of the screw $a^3$, carried by the outward-extending arm of the bracket and said screw, substantially as described.

7. The combination, in a signaling apparatus, of a magnet having prolonged poles, the sides of which are curved and oppositely arranged in relation to each other, an armature pivoted between said poles and having two wings regularly curved in opposite directions and decreasing in width from their bases, a target attached to or carried by one wing of the armature, and an adjustable weight attached to or carried by the other wing of the armature, as and for the purposes specified.

PRESTON C. MORSE.
HENRY D. WINTON.

Witnesses:
CHARLES Q. TIRRELL,
EDWARD L. GREENWOOD.